United States Patent [19]

Forsyth

[11] Patent Number: 5,080,591

[45] Date of Patent: * Jan. 14, 1992

[54] INSTRUCTIONAL GLOBE

[76] Inventor: Maria K. Forsyth, 63 Sterling Pl., West Boylston, Mass. 01583

[*] Notice: The portion of the term of this patent subsequent to Jan. 10, 2006 has been disclaimed.

[21] Appl. No.: 294,869

[22] Filed: Jan. 9, 1989

Related U.S. Application Data

[63] Continuation-in-part of Ser. No. 874,608, Jun. 16, 1986, Pat. No. 4,797,102, which is a continuation of Ser. No. 642,649, Aug. 20, 1984, Pat. No. 4,595,367.

[51] Int. Cl.$^5$ .................................................. G09B 27/08
[52] U.S. Cl. ...................................................... 434/147
[58] Field of Search ........................................ 434/147

[56] References Cited

U.S. PATENT DOCUMENTS

| | | | |
|---|---|---|---|
| 457,487 | 8/1891 | Bowsher | 434/143 |
| 1,042,456 | 10/1912 | Manson | 434/136 |
| 1,523,188 | 1/1925 | Flood | 434/147 |
| 1,629,582 | 5/1927 | McClintock | 434/147 |
| 1,897,580 | 2/1933 | Lawton | 434/131 |
| 1,959,601 | 5/1934 | Schulse | 434/145 X |
| 2,083,988 | 6/1937 | Dupler | 434/131 |
| 2,496,827 | 2/1950 | Tellier | 434/143 |
| 2,515,400 | 7/1950 | Dupler | 434/145 |
| 2,537,329 | 1/1951 | Campbell | 434/131 X |
| 2,957,251 | 10/1960 | Nystad et al. | 434/147 |
| 3,016,629 | 1/1962 | Case | 434/147 |
| 3,055,124 | 9/1962 | Gilmer, Jr. et al. | 434/132 |
| 3,063,163 | 11/1962 | Dukes, Jr. | 434/131 |
| 3,281,961 | 11/1966 | Tiddens | 434/131 |
| 3,316,669 | 5/1967 | Nachbar | 273/DIG. 30 X |
| 3,374,560 | 3/1968 | Forsyth | 434/147 X |
| 3,495,833 | 2/1970 | Wesley | 434/150 X |
| 3,618,955 | 11/1971 | Barnes | 434/147 X |
| 4,115,930 | 9/1978 | Beck | 434/151 X |
| 4,377,286 | 3/1983 | Constantinescu | 434/131 |
| 4,494,935 | 1/1985 | Miller | 434/132 |
| 4,595,367 | 6/1986 | Forsyth | 434/147 |
| 4,797,102 | 1/1989 | Forsyth | 434/147 |

FOREIGN PATENT DOCUMENTS

| | | | |
|---|---|---|---|
| 452479 | 5/1968 | Switzerland | 40/494 |
| 4489 | of 1909 | United Kingdom | 434/131 |
| 10681 | of 1989 | United Kingdom | 434/133 |

Primary Examiner—William H. Grieb
Attorney, Agent, or Firm—Blodgett & Blodgett

[57] ABSTRACT

An instructional globe facilitates the guided or self-directed study of terrestrial geography. A globe-shaped body is constructed so that major geographical features are represented on detachable appendages. Cues are provided for the proper placement of the appendages on the surfaces of the globe-shaped body, the cues consisting of niches, embossed or printed shapes, or indentations, unambiguously corresponding to the appendages. The globe-shaped body may be build up from a skeletal framework to hold a number of blocks, the blocks together forming a spherical surface. Appropriate portions of geographical features, or portions of cues, are formed on the blocks. A number of means are shown for attaching the blocks to the framework and the segments to the body. A series of embodiments apply the invention to the problems of teaching geography to students with varying or progressing learning skills.

25 Claims, 13 Drawing Sheets

INSTRUCTIONAL GLOBE

REFERENCE TO CO-PENDING APPLICATIONS:

This application is a continuation-in-part of application Ser. No. 06/874,608, filed June 20, 1986, now U.S. Pat. No. 4,797,102, issued Jan. 10, 1989, which was a continuation of co-pending application Ser. No. 06/642,649 filed on Aug. 20, 1984, now U.S. Pat. No. 4,595,367, granted June 17, 1986.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Learning geography, especially on a global scale, involves the exercise of a great deal of spatial imagination, often in three dimensions. The ability to use this kind of imagination is usually crude in the very young and must be slowly nurtured and developed during the educational process. Moreover, in the early stages of the development of the necessary skills, different children utilize different learning modalities. Even the same child at different levels of development may use different modes. An acceptable general method of developing this skill is to begin with the examination of highly concrete representations of many geographic and geometric concepts, using aural, visual, and tactile reinforcement. A comfortable familiarity with such concrete representations lays a foundation for the development of a more abstract framework in which a student may organize the concepts involved.

To this end, educators have developed a number of visually or tactually stimulating models of geographical phenomena, such as relief maps and variations of the well-known terrestrial globe. Many of these devices are suitable for a form of programmed teaching in which a terrestrial globe is built up piece-by-piece from a large number of separate parts in the form of a kit. An example of such a device is disclosed in my own U.S. Pat. No. 3,374,560.

These modules fall short of the ideal teaching aid in a number of respects. For instance, many of the prior devices miss an opportunity to interest the very young by lacking a sufficient element of "play". On the other hand, terrestrial globes have been made in the form of puzzles in which the element of play has defeated the educational value of the device. In such cases, there is insufficient direct visual or tactile reinforcement of geographical ideas. Some of the prior terrestrial globes allow the placement of component parts in geographically inconsistent positions, thereby reinforcing inaccurate geographic relationships. Many such globes can be assembled only by a person already familiar with terrestrial geography, offering no assistance to the untutored student who is working or playing alone. Further, the means used to attach component parts to these globes have tended to be either unreliable or overly complicated for a young person whose hand/eye coordination is not fully developed. In general, prior globes have been designed with insufficient attention to the differing cognitive and perceptive levels, learning modes, and coordination ability of different age groups and individuals. These and other difficulties experienced with the prior art devices have been obviated in a novel manner by the present invention.

1. It is, therefore, an outstanding object of the invention to provide a teaching aid in the form of a terrestrial globe which may be partially assembled by the student or teacher in an interesting and pleasing manner, in order to reinforce the geographical ideas involved.

2. Another object of this invention is the provision of a teaching aid in the form of an instructional globe having sufficient elements of play to hold the interest of a distractible young student.

3. A further object of the present invention is the provision of an instructional globe which may be partly assembled by a geographically naive student by means of a series of visual or tactile cues to the proper placement of the component parts.

4. Another object of the present invention is the provision of an instructional globe with the flexibility to be used to teach either several students at different ability levels or a single student with progressing abilities and changing learning modalities.

5. It is another object of the instant invention to provide an instructional globe which may be partially assembled by means which are reliable and easily manipulated without requiring highly developed coordination.

6. A further object of the present invention is the provision of an instructional globe which is simple in construction, inexpensive to manufacture, and capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

Generally, the invention is an aid for the teaching of physical and political geography which appeals to the tactile and visual senses, and consists of a globe-shaped body and a number of information-laden appendages attached to the body in manners and in positions to visually or tactilely reinforce geographical habitat concepts of the world. In an embodiment for the very young, the globe-shaped body has simulated waves in the oceans. The waves comprise convolutions on the surface of the oceans. Sculpted, etched, engraved or merely embossed representations of waves may also be used. The appendages are detachable to allow partial assembly as part of the learning process. In an embodiment for the very young, the appendages may consist of medallions bearing images having geographical significance. The medallions are removably attached to the globe-shaped body in a pivoting manner to move in an oscillating mode in response to rotation of the globe-shaped body.

A more advanced embodiment consists of a globe-shaped body with appendages, the appendages alternatively (or in addition) comprising a number of spherical surface segments, shaped, in outline, like major geographical features of a terrestrial globe such as continents and ocean currents. In the preferred embodiment, the segments are three-dimensional and highly stylized. A variety of means are provided for removably attaching the surface segments to the body at their geographically proper positions. The means are reliable and easily manipulated by even the very young whose coordination ability is not yet highly developed. For example, a resilient material may be used to secure the appendages to indentations in the globe-shaped body. Other easily manipulated mechanical or magnetic means may also be used when appropriate. The proper positioning of the segments is facilitated by a plurality of cues formed on the body, each cue resembling in shape its corresponding spherical segment. The cues are visually or tactilely prominent. In a lower-level embodiment, indentations in the globe-shaped body provide the cues, the segments being inserted in the indentations.

In a third level embodiment, the globe-shaped body is provided with cues for the placement of appendages in the form of appliques or inserts bearing geographical representations. These appendages may be three-dimensional and highly stylized representations of geographical information. Lines of latitude and longitude are represented by raised or indented ribs. To avoid obscuring the cues, the ribs stop at the periphery of said cues.

In a fourth level embodiment, the globe-shaped body consists of a transparent hollow sphere comprised of two detachably joined hemispheres such that one may easily insert a skeletal framework representative of lines of latitude and longitude. The cues being embodied are etched or painted outlines on the inside or outside surface of the hemispheres. Preferably, the segments are in the form of transparent three-dimensional overlays. Opaque overlays may also be used. An equatorial disk and/or quarter disk may be employed to illustrate the strata of the earth's interior.

A fifth level embodiment of the invention generally comprises a hollow sphere with longitudinal and latitudinal cross members thereon depicted. These cross members may comprise raised or indented ribs. Appendages in the form of spherical polygonal blocks are placed between the ribs such that they form a relatively continuous surface. Each block has an outer surface which is appropriately curved and provided with a geographically significant representation.

A sixth level embodiment of the globe-shaped body of the invention generally comprises a globe-shaped skeletal framework made up of latitudinal and longitudinal cross members. Together, the cross members define a plurality of spherico-polygonal windows. Each of these windows is provided with a removable but closely-fitting block. Each block has an outer surface which is appropriately curved and provided with a geographically significant representation so that when the blocks are fitted into their corresponding windows, their outer surfaces line up to form a globe-shaped body having a relatively continuous surface and geographically accurate representations of terrestrial features. The skeletal framework of the blocks may be comprised of a resilient material to easily snap the blocks into the windows. The skeletal framework of this realization of the invention may alternatively comprise spherical-triangular or spherical wedge-shaped elements or "slices," attached to the equator and the poles, or the poles by a variety of mechanical or magnetic devices.

A removably attached shell of slightly larger radius than the globe-shaped body may be provided and pivotally attached in a manner to illustrate the so-called circle of illumination during the four seasons.

Desirably, the globe-shaped body is provided with a support in the form of a base. Optionally, the support includes a removably attachable arcuate frame of larger radius of the curvature of the globe with which the globe is rotatable supported by suitable bearing means with a clearance space between the surface of the globe and the arcuate frame and the latter is provided with graduations representing degrees and graduations representing the climatic zones between the poles.

BRIEF DESCRIPTION OF THE DRAWINGS

The character of the invention may be best understood by reference to some of its structural forms, as illustrated by the accompanying drawings, in which.

DESCRIPTION OF THE PREFERRED EMBODIMENT

Figure 1:
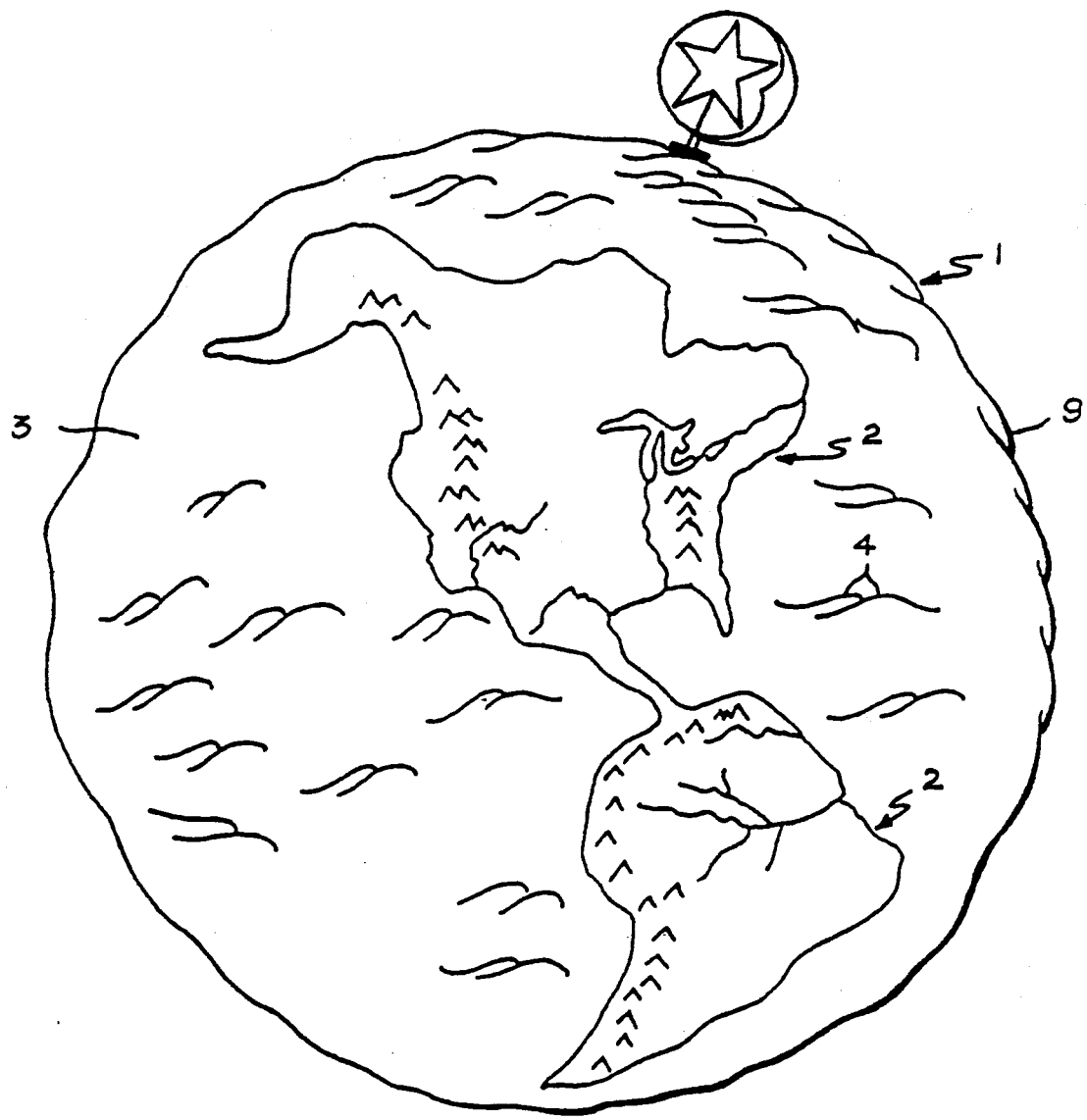
FIG. 1 is a view of an elementary instructional globe embodying the principals of the present invention.

Referring first to FIG. 1, there is shown a globe embodying the general features of the present invention comprising a first level instructional globe-shaped body 9. The globe-shaped body 9 is provided with highly stylized and simplified representations of terrestrial features such as the continents, that is, land areas 2 and oceans 3. In a preferred embodiment, the land areas 2 are three-dimensional and the oceans 3 are configured with three-dimensional waves 4 in the form of convolutions, depressions, or other sculpted or engraved representations. The land areas 2 may take the form of appendages 5, FIG. 13. Each appendage is removably attached to the globe by means of one or more plugs 7 fixed to the back side of the appendage 5 for insertion in holes 8 in the globe.

Figure 1A:
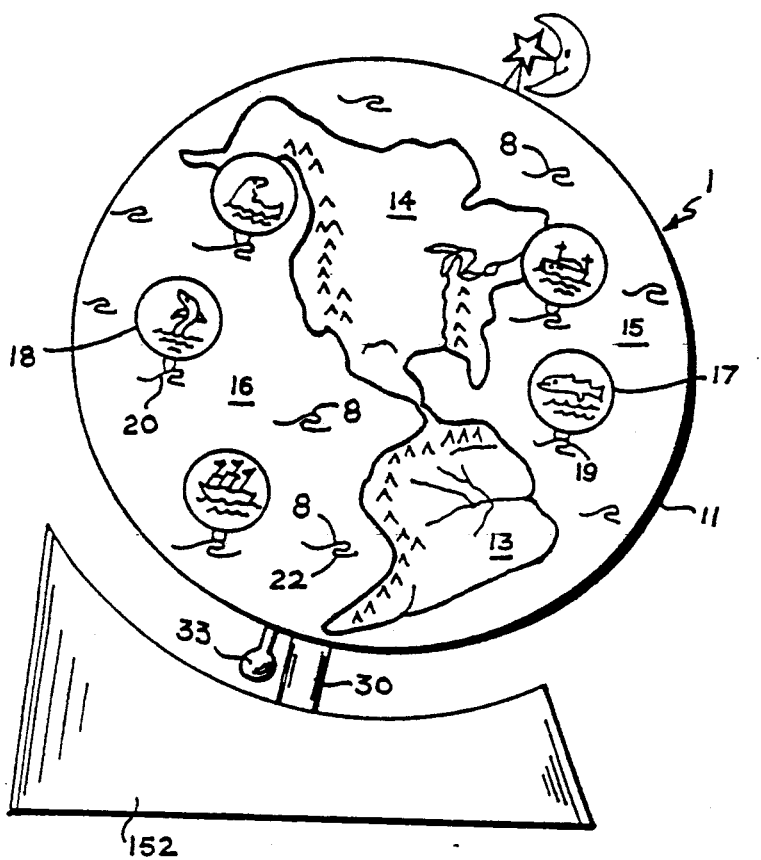
FIG. 1A is a view of an elementary instructional globe containing appendages in the form of medallions and/or removable stylized continents mounted to a support.

Referring to FIG. 1A, the globe-shaped body 9 is provided with highly stylized and simplified three-dimensional representations of terrestrial features such as continents 13 and 14 and oceans 15 and 16, the oceans having convolutions simulating waves 8. A number of detachable appendages in the form of medallions may be added such as 17 and 18, each bearing a representation of a geographically significant fact or feature. Each appendage 17, 18 is provided with a corresponding "niche" or location 19, 20 such that, on attaching each appendage to its corresponding "niche" or location, the proximity of the representation on the appendage and the location of the niche combine to visually reinforce a geographical idea. In the embodiment depicted in FIG. 1A, the appendages 17 and 18 bear pictures of certain sea creatures and their respective niches 19 and 20 correspond to the usual habitats of the creatures.

Figure 2:
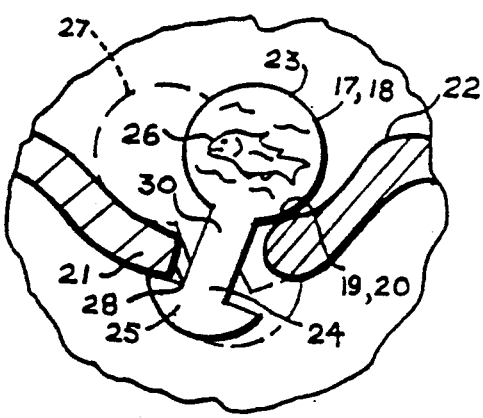
FIG. 2 is an enlarged section taken on the line 2—2 of FIG. 1A showing attachment of a medallion to the globe.

Desirably, the surface of the globe in the ocean part is configured, as related above, to simulate three-dimensional waves 8 in the form of convolutions or depressions and niches, FIG. 2. In the preferred embodiment, the niches comprise concave depressions 22 at the base of the waves 4, at the bottoms of which are openings 28. Openings may also be at the top of the waves. These features enhance the visual reinforcement with a kinesthetic component. The means for attaching the appendages or medallions 17, 18 is shown in FIG. 2 and FIG. 1A, respectively. The section through the niche corresponding to the appendage 17 in the ocean part 15 shows the niche in the form of a shelf 21 with an upwardly concave surface. At the bottom of the niche, there is a slot 28. The appendage 17 consists of a circular or oval medallion 23 bearing the representation 26 of a fish and is supported in the depression 22 by a neck part 24, and a base 25. The medallion 23 is of a smaller radius of curvature than the depression 22 when a depression is used. For this reason, when the appendage is placed in its niche, with the base and neck part inserted in the opening 28, a rotational motion of the globe-shaped body about its central shaft 30 imparts an oscillation motion to the appendage, the extent of which is shown by the dotted line 27, FIG. 2. The oscillation is sustained by momentum of the base 25. This motion is pleasing to a young child and helps to reinforce the associated geographic fact. The child will want to give each medallion a "a ride around the world" by placing it in its proper niche.

Figure 3:
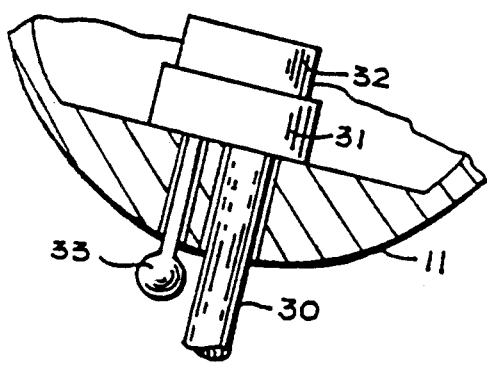
FIG. 3 is a section taken on the line 3—3 of FIG. 1A showing a music box.

The child's attention can be further focused by the provision, as shown in FIG. 3, of a motor 31 and a music box 32 inside the globe-shaped body. The motor and music box can be battery or electrical type. It can also be of the windup variety, preferably wound by a common key 33. The motor imparts rotation to the globe, and may also power the music box.

The educational versatility of the first level globe may be enhanced by the provision of further appendages in the form of appliques or inserts bearing highly simplified and stylized spherical surfaces representative of land masses, such as the continents 13 and 14. These should be attachable and detachable, with cues provided for their proper placement. The particular type of attaching means, and the choice of cues, will be consistent with the coordinating ability and perceptual level of the very young child.

A variety of embodiments of this form of the invention are described below in connection with higher level globes. The particular type of attaching means and the choice of cues will be consistent with the coordinating ability and perceptual level of the child.

Figure 4:
FIG. 4 is a perspective view of an instructional globe according to the present invention in which the cues are embodied by shallow indentations and/or etched or painted outlines with raised or indented ribs of latitude and longitude stopping at the periphery of said cues.
Figure 4A:
FIG. 4A is a perspective view of an instructional globe showing the reverse side of FIG. 4.
Figure 5:
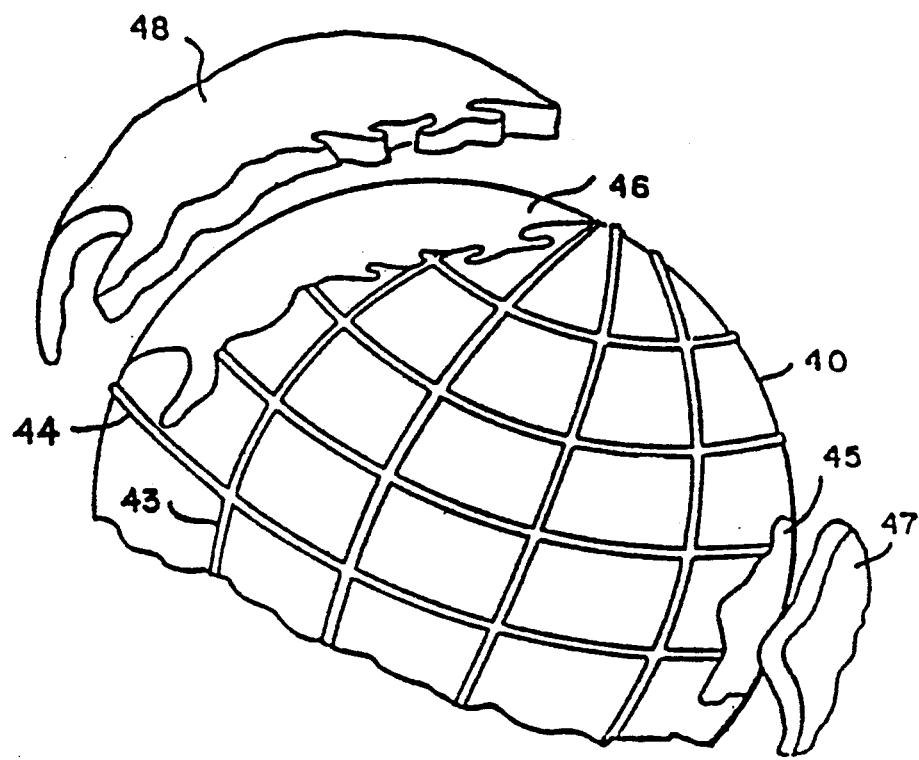
FIG. 5 illustrates the correlation of spherical segments to said cues.
Figure 5A:
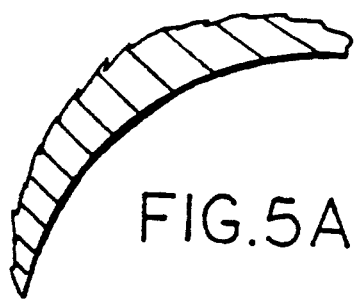
FIG. 5A illustrates a profiled segment of stylized topography magnified several times.

A second level embodiment of the invention is illustrated in FIGS. 4 and 5. A globe-shaped body 40 is provided with cues for the placement of appendages in the form of appliques or inserts bearing geographical representations. The cues may be in the form of shallow indentations such as 41 and 42, FIG. 4, in the surface of the body or may be defined by printed, embossed or otherwise formed lines on the surface.

Major lines of latitude and longitude are represented by raised ribs such as 43, 44. To avoid obscuring the cues, these raised ribs do not cross the cues, but stop at the edges of the cues.

As shown in FIG. 4, the cues 41, 42, each correspond in outline to a spherical surface segment representative of a geographical feature such as a continent, island, ocean current, etc. For example, cues 45 and 46, FIG. 5, correspond in configuration, respectively, to segments 47 and 48, each representative of land masses.

Figure 10:
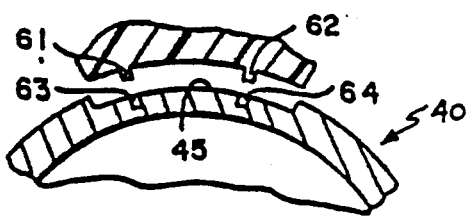
Figure 11:
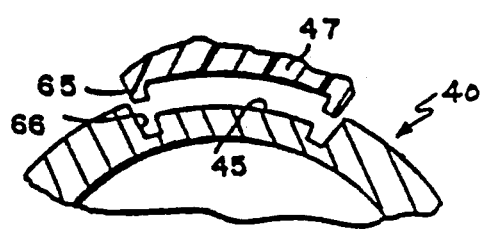
Figure 12:
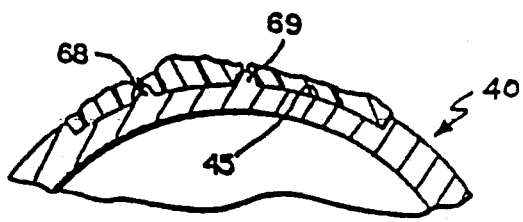
Figure 13:
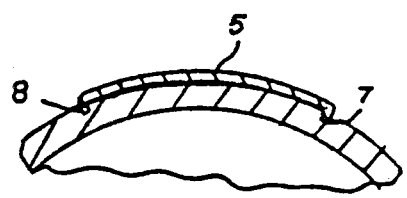

A number of novel, reliable, and uncomplicated means to secure the shperical segments such as 47 and 48 to the globe-shaped body 40 in response to the cues such as 45 or 46 are shown in FIGS. 6 through 13. FIGS. 6 through 12 show means which are appropriate mainly when the cue 45 consists of an actual indentation or shallow recess in the globe-shaped body. FIG. 13 illustrates means which is appropriate when the cues consists of mere printed or embossed outlines, as will be described below. FIG. 12 shows means appropriate when the cue comprises a recess or outline and the spherical segment is further divided into subsegments, for example, to represent subcontinents, countries, states, etc.

Figure 6:
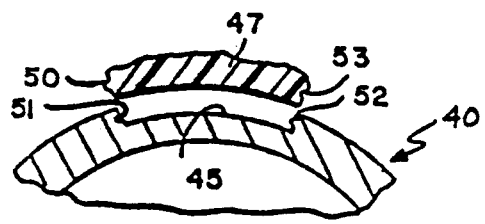
FIGS. 6 through 13 are sections showing alternative means for attaching the segments to the globe within the cues.

In FIG. 6, the spherical segment 47, representative of a continent, is shown in cross section to be appropriately curved to match a curved recess on the spherical surface, which recess constitutes the cue 45. Both the globe-shaped body and the spherical segments are composed of a stiff but resilient material such as plastic. The spherical segment is provided with a rib 50 around its peripheral edge and a notch 51 is provided around the corresponding peripheral edge of the recess cue. Thus, the spherical segment may be snapped into place in the recess and held there by the engagement of rib 50 and notch 51. Alternatively, the rib may be provided on the periphery of the recess as indicated at 52 and the notch 53 provided on the peripheral edge of the spherical segment.

Figure 7:
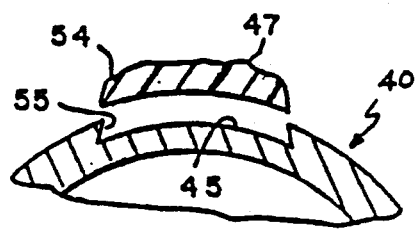

In the means provided in FIG. 7, the spherical segment 47 is provided with a beveled edge 54 and the cue 45 is provided with an undercut edge 55. The segment and the globe-shaped body are formed of resilient material as above, and the segment may be snapped into place and removed as desired.

Figure 8:
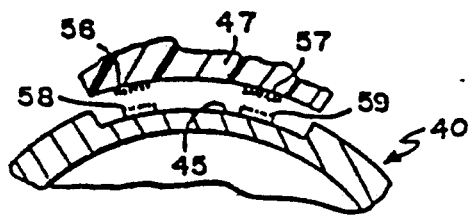

Whatever the nature of the cues may be (either recesses or mere printed or embossed outlines), the attaching means shown in FIGS. 8 through 11 and 13 may be appropriate. In FIG. 8, the segment 47 is attached by means of complementary pairs of hook and loop type fastening material such as Velcro. In the illustration, spots of hook material 56 and 57 are applied to the underside of the segment. Spots of the loop material 58 and 59 are applied likewise in corresponding spots on the globe-shaped body.

Figure 9:
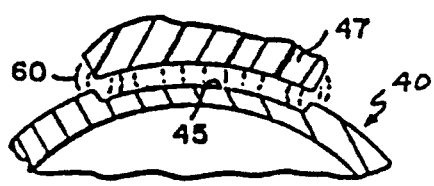

As illustrated in FIG. 9, both the spherical segment 47 and the globe-shaped body 40 may be formed wholly or partially of ferromagnetic materials. These may be properly magnetized in relation to each other so that the segment will be attracted mechanically to its corresponding cue 45. Likewise, the means may be produced by forming the parts from electrostatic plastic, and setting up an electrostatic attraction between the segment and cue in the manner of the electrostatic plastic games marketed as Colorforms. Both types of attractive forces are indicated by lines of force 60.

The segments may be reversibly held in place by a number of male/female connector assemblies such as pins 61 and 62 and holes 63 and 64, FIG. 10. Equivalents such as tabs and slots may also be used.

FIG. 11 shows a further means for attaching the segments. The segment 47 is provided with a lip 65 around its periphery on its concave side. An indented channel 66 is provided around the periphery of the recessed cue 45. The lip 65 fits snugly in the channel 66 to hold the segment.

The means shown in FIGS. 8 through 11 and 13 are also appropriate to attach a subdivided segment. If the means of FIGS. 6 or 7 are used, however, an equivalent of the structure illustrated in FIG. 12 could be employed. In this case, peripheral edges of the subdivisions which do not engage the outer peripheral edge of the cue instead engage supplementary securing means such as the ridges 68 and 69. These ridges, for example, can be provided with ribs such as 71 and 72 on ridge 69 to engage notches on the inner peripheral edges of the subdivisions. The ridges further consitute supplementary cues for the proper placement of the subdivision pieces since they necessarily follow the outlines of the subdivisions.

The information or geographical representation borne on the spherical surface segments can vary widely. As mentioned above, the simple outline of land masses or the size and direction of ocean currents may be indicated on the segments. Because the segments are detachable, however, the present invention provides a plurality of segments for each cue, each bearing a different type of geographical representation. For example, in FIG. 14, the shallow cue 75 corresponding to the continents of South America is provided with a primary segment 76a carrying a representation of the political division of the continent. In accordance with the present invention, a plurality of alternate segments are provided, each carrying a different representation. Thus, segment 76b carries topological information, segments 76c shows agricultural divisions and segment 76d shows separation into language or ethnic areas. Each of these segments is structured to be attached in one of the manners described above to the globe-shaped body in response to its shaped correspondence to the shallow indented cue 75.

Moreover, on a given segment, or anywhere on the globe-shaped body, provision may be made for the placement of appendages representing highlights of the local geography such as animals, ethnic types, architectural or engineering accomplishments, flags, etc. It is now evident how to employ, for this purpose, any of the various attaching means elsewhere disclosed in this specification.

Figure 15:
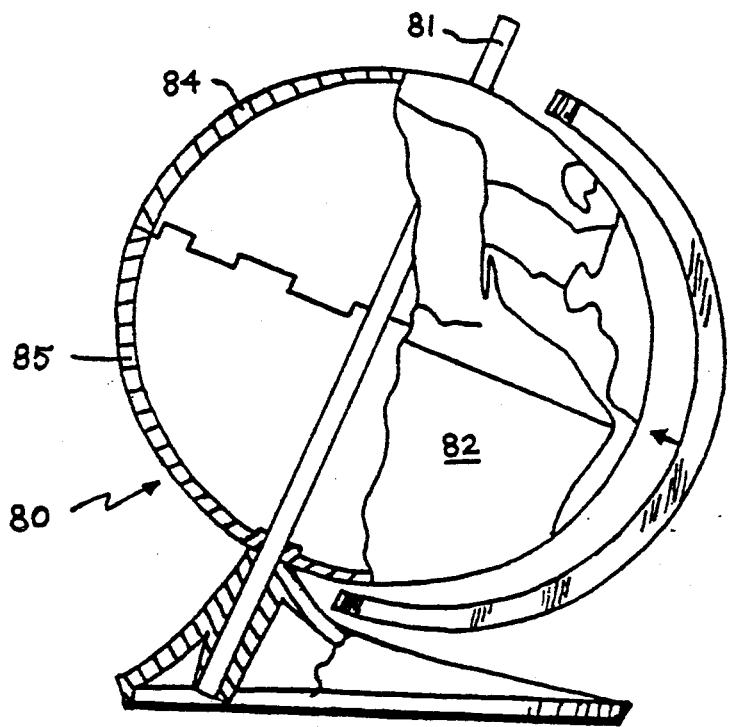
FIG. 15 shows an instructional globe according to the present invention comprising two transparent hemispheres in which the cues are embodied in etched, engraved, or imprinted outlines and the continent overlays are comprised of transparent materials.

A third level embodiment of the present invention is illustrated in FIG. 15. A transparent or nearly transparent globe-shaped body 80 is mounted on a shaft 81. Sperical surface appendages in the form of overlays 82 are provided and carry georgaphical representations such a land masses, islands, ocean currents, etc. The overlays 82 representing land masses may be preformed three-dimensional spherical surface segments, FIG. 18. Those overlays representing land masses are either translucent, transparent or opague. In the preferred embodiment, appendages representing the land masses are of a colored transparent material such that structure representative of the strata of the earth's interior or representative of the earth's grid system can be easily viewed.

Figure 16:
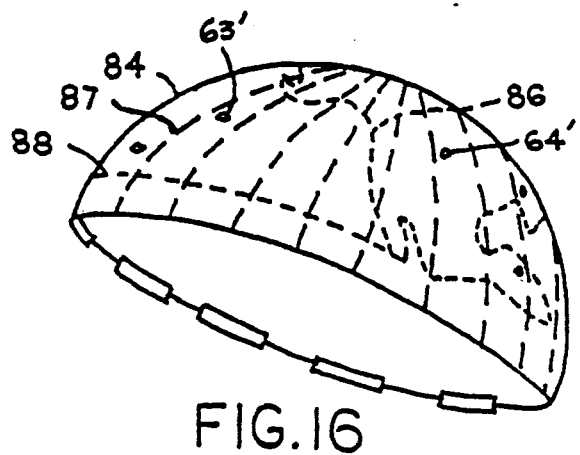
FIG. 16 shows one hemisphere of an embodiment of the globe-shaped body shown in FIG. 7.
Figure 17:
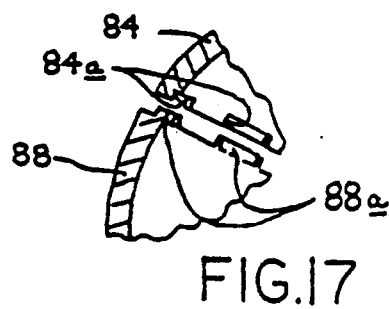
FIG. 17 is a fragmentary section showing means to join the hemispheres shown in FIG. 15.

The transparent body 80, FIG. 15, is preferably of two hollow hemispheres 84, 85. The hemisphere 84 is shown in FIG. 16. As the figure illustrates, the cues of the invention are here embodied in etched, printed or embossed outlines such as 86 formed on the inside or outside of the sphere. The cues are visible due to the transparency of the globe-shaped body 80. Lines of longitude such as 86 and latitude such as 88 are also etched, engraved, or imprinted on the inside or outside surface. In the preferred embodiment, the hemispheres 84, 85 are connected by pressure fittings 84a and 88a in FIG. 17 or by like connections that will allow them to be joined and separated easily.

Figure 18:
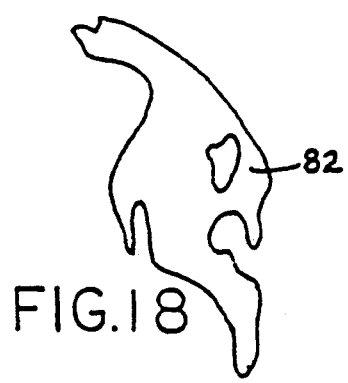
FIG. 18 shows a spherical surface segment for use with the FIG. 15 embodiment.
Figure 19:
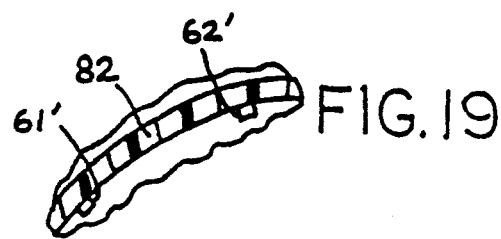
FIG. 19 is a section taken on the line FIG. 15.

FIG. 18 illustrates an overlay 82 which embodies one of the appendages of the invention and carries geographic representations as described for the segments of the second level globe. The appendages in the preferred embodiment are of transparent material, many of which will be three-dimensional. When desired, the spherical appendages can be made opaque. The attachment is by any of the means shown in FIGS. 8 through 11 and 13. For example, FIG. 19, shows a cross section through an overlay 82 with attaching means 61', 62' analogous to those shown in FIG. 10. The, pins 61' and 62' of FIG. 19 are inserted snugly in the holes 63' and 64', respectively, of FIG. 16 to attach the overlay 82 to the cue 86.

Figure 20:
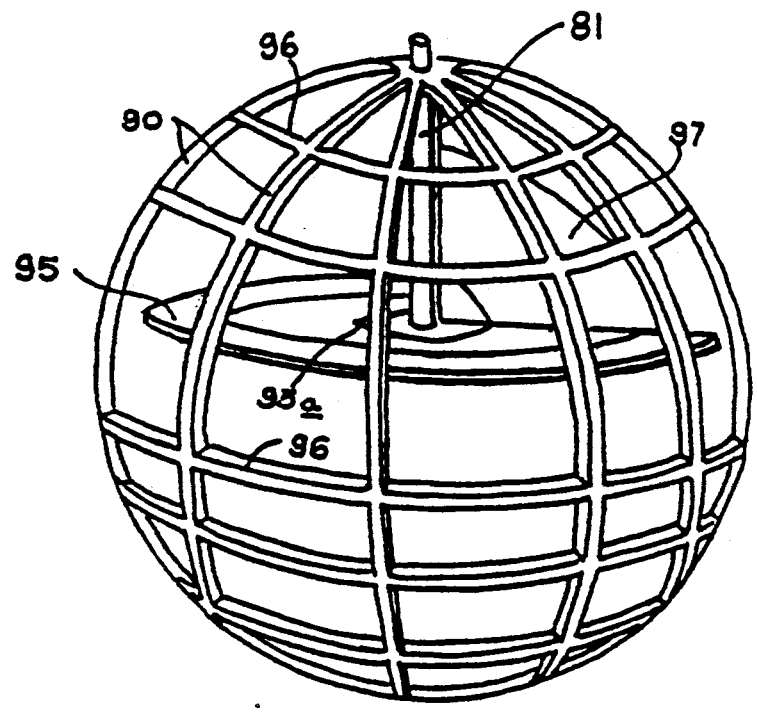
FIG. 20 illustrates an internal skeletal structure for use with FIG. 15.
Figure 21:
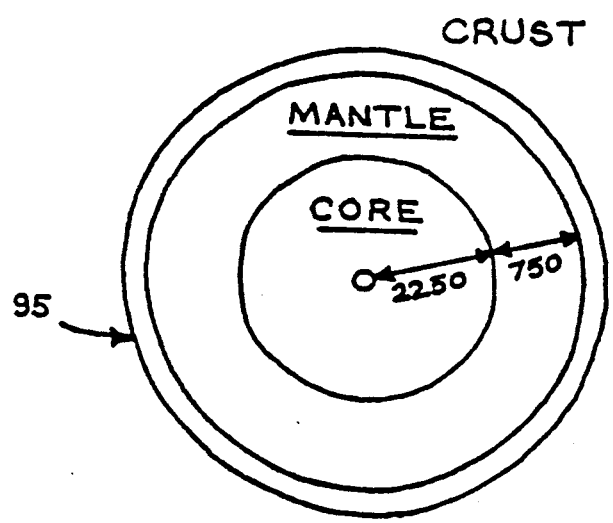
FIG. 21 shows in detail the strata of the earth's interior.

The impact of this third level globe may be enhanced by the inclusion of a skeletal structure inside the globe. This is represented in FIG. 20 by a number of longitudinal members such as 90 and latitudinal member 96. This third level globe may also be enhanced by inserting therein an equatorial disk 95, FIG. 21, or a sector 97 of a disk, FIG. 20, representative of the strata of the earth's interior, its various layers, and their relative and absolute size relationship. As shown in FIG. 20, the sector of the disk will be attached to the shaft 81 representative of the axis about which the earth turns. The equatorial disk 95 is secured to the shaft 81 by a flange 95A upon which the disk 95 is placed. A nut or bolt or the like will hold the flange in place. Resilient clips are provided to attach the sector 97 of the disk running from the equator to the pole in its proper position. In this manner, the disk 95 and the sector of the disk 97 may easily be removed from the hemispheres and replaced by the skeletal structure depending on the lesson being taught. A polar sector 21C may be included defining climatic zones.

Figure 22:
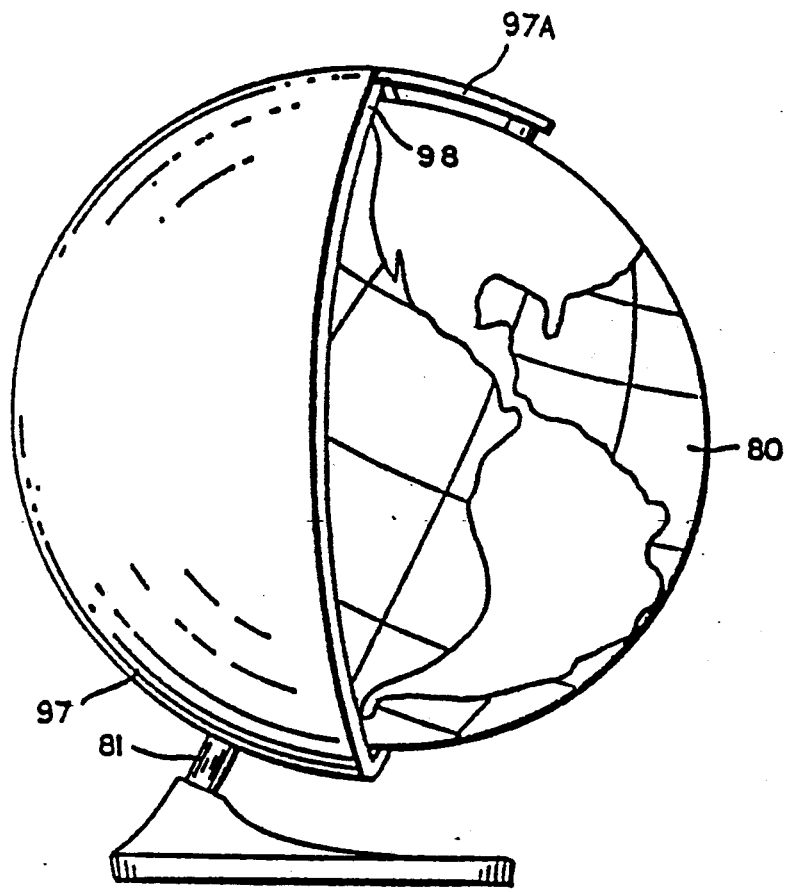
FIG. 22 illustrates a removably attachable hemispheric "circle of illumination"

For more advanced students, the globe-shaped bodies may be removably attachable structure for illustrating the "circle of illumination" as it would appear during the four seasons. That is, the division of the earth into areas of night and day by the earth's rotation with respect to the sun. As shown in FIG. 22, with the embodiment of FIG. 14 as an example, a thin hemispheric shell 99 is illustrated whose inner radius is slightly larger than that of the globe-shaped body 80. FIG. 22 illustrates the provision of notches 97A—97A whereby the hemispheric shell 97 may be adjusted upon the shaft 81 such that the "circle of illumination" may be changed to show areas illuminated at different times of the year. The notches 97A enable the hemispheric shell to be removably attached to the shaft 81. The thin hemispheric shell 99 is preferably made of almost transparent gray material such as tinted plastic to imitate shadow. The notches 99A at the base of the shell and the extension at the poles enable it to show light and dark areas during the four seasons.

Figure 23:
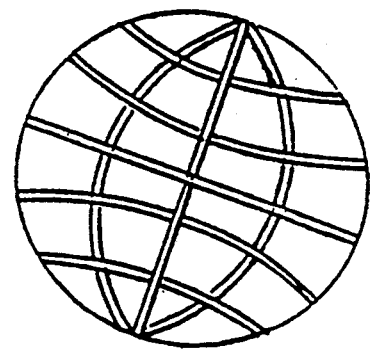
FIG. 23 illustrates a hollow sphere and means in the form of raised lines of latitude and longitude for placing segments thereon.
Figure 24:
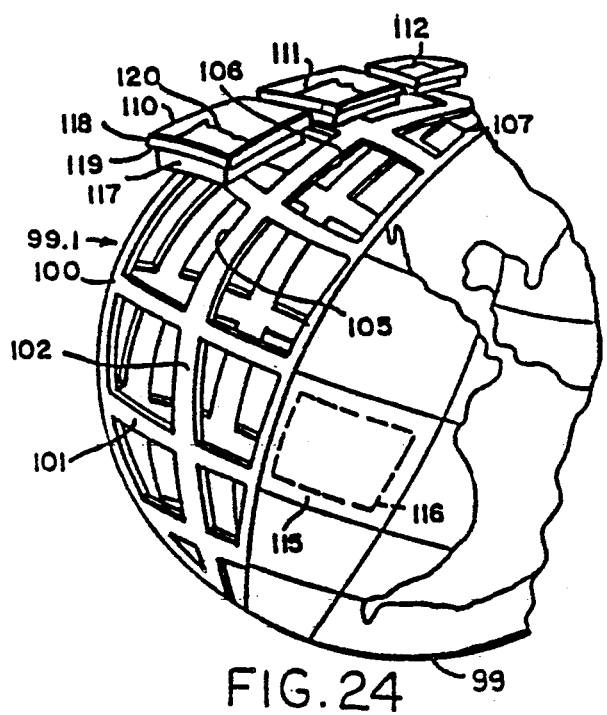
FIG. 24 shows an exploded view of a skeletal instructional globe embodying the present invention.
Figure 24A:
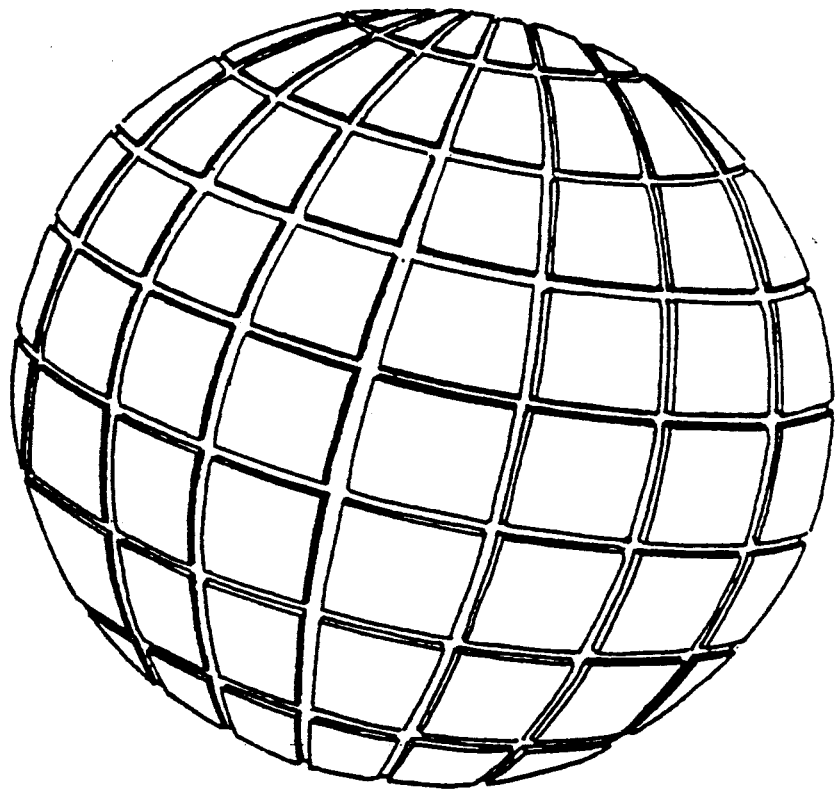
FIG. 24A shows a globe comprised of blocks, the gaps between the blocks forming indented lines of latitude and longitude.

Although the globe-shaped body of any of the above embodiments may be formed as an integral unit, such as by injection or blow-molding, the instructional value and play aspect are both increased when the student builds the globe-shaped body up from components parts as illustrated in FIGS. 23 and 24. These may be referred to as a fifth and sixth level globe. To this end, the body 99.1, FIG. 24, is preferably made up of a globe-shaped skeletal framework 100. The framweork is composed of latitudinal cross members such as 101 and longitudinal cross members such as 102. The cross members define a regularly arranged plurality of windows such as 105. The windows whose sides are spherical lines of latitude and longitude are "spherico-polygonal".

The remainder of the globe-shaped body 99.1 is filled out by the insertion of specially constructed blocks in each window. Reference numerals 110, 111, 112 refer to a number of such blocks in unassembled stage, that is, removed from their respective windows 105, 106, 107. Numeral 115, on the other hand, indicates a block inserted in the appropriate window 116.

The blocks of the present invention, exemplified by 110, generally consist of a lower section 117 and an upper section 118. The lower section is adapted to be inserted in the window corresponding to the given block (in this case, 105) and to be secured there by mechanisms which will be described below. The upper section 118 projects beyond the lower section on each side by about half the width of the corresponding latitudinal or longitudinal cross member. This projection has the effect of forming a detent 119 to properly limit the depth of insertion of the block. Consequently, the outer surfaces of the blocks will be properly aligned when the blocks are inserted and will together form a smooth and subsequentially continuous spherical surface. The outer surfaces which are exemplified by 120 are provided with outlines or drawings of terrestrial features and water bodies which are appropriate for the position of each block. The globe-shaped skeletal framework illustrated in FIG. 24 assumes a great deal of geographical knowledge. The cues to the correct placement of the "blocks" reside in the ribs forming the lines of latitude and longitude.

Figure 26:
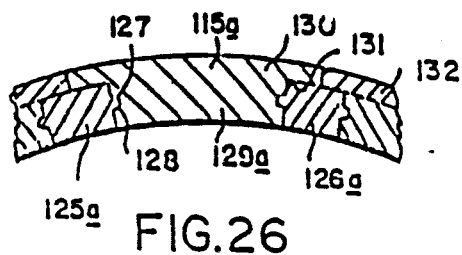

In FIG. 26, the block 115a formed a resilient material is secured to the cross members 125a and 126a which form the window 116 by the engagement of a rib 127 along the peripheral edge of the window with a notch 128 around the peripheral edge of the lower section 129a of the block. The upper section 130 of the block extends beyond the lower section to form a detent such as 131. The upper section 130 extends about one-half the width of cross member 126a to meet with the upper section 132 of an adjacent block. Thus, the blocks together form a substantially continuous and smooth surface. Each of the alternative securing means described below also includes such a detent-forming extension of the upper section of the block.

Figure 27:
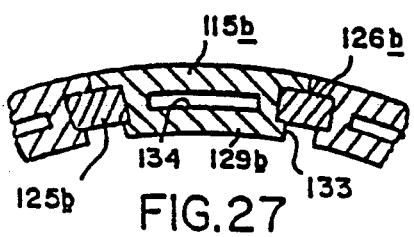

In FIG. 27, the lower section 129b of the block 115b extends below the cross members 125b, 126b and is formed of a very resilient material, such as soft rubber. A slight lip 133 engages the bottom of the cross members. To add to the flexibility of the block, the lower section 129b may be formed of a hollow shell with a central cavity such as 134.

Figure 28:
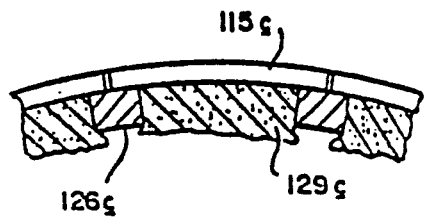
FIGS. 26 to 31 are alternative structures for sections of FIG. 24.

A very safe and inexpensive, but effective, manner of securing the blocks, as illustrated in FIG. 28, is to form the lower section 129c from a spongy material. This can be actual sponge, an artifical sponge of plastic, a block of foam rubber, or equivalent materials. The lower section of the block 115c may be simply squeezed into its window. As the figure shows, the block is held by the pressure of the cross members, such as 126c, 129c.

Figure 29:
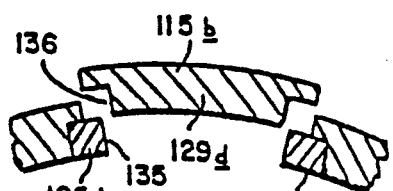

A further means of securing the blocks is shown in FIG. 29. There, the cross members 125d, 126d are made with an outward bevel corresponding to an inward bevel on the lower section 129d, and complementary friction-increasing means are formed on contacting surfaces such as 135, 136. Such means include a roughening of both surfaces, strips of cloth, or strips of hook-and-loop fastening material such as VELCRO. Pressure fittings may also be used.

Figure 30:
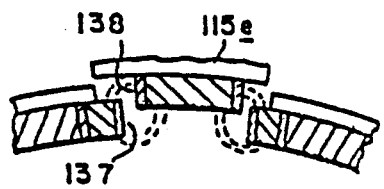

As shown in FIG. 30, the blocks 115e may also be made up of magnetic material or provided with attracting compositions to releasably hold attracting ferromagnetic elements such as 137, 138 in positions to releasably hold the block when it is inserted correctly in its window.

Figure 31:
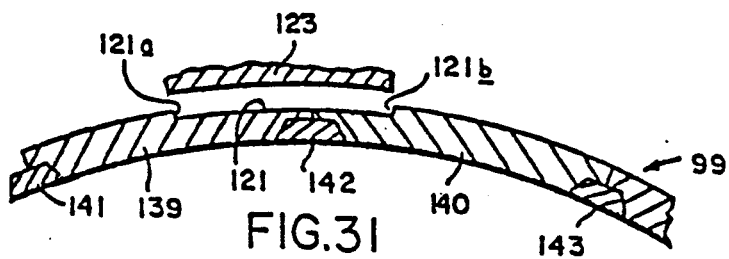

The blocks and indented cues may be integrated as illustrated in FIG. 31. As shown in the cross section, two blocks 139, 140 are secured by any of the means shown in FIGS. 26 through 29 (or their equivalents) to cross members 141, 142, 143 to form a portion of the globe-shaped body 99. Block 139 is provided with a portion 121a of cue 121. In this figure, the cue 121 is an actual indentation having the shape of North America or a subdivision thereof. Block 140 carries a further portion 121a of cue 121. Spherical segment 123 corresponds to the cue formed by the joining of portions 121a and 121b and is secured to the globe-shaped body by any of the means illustrated in FIGS. 6 through 12 or their equivalents.

Figure 32:
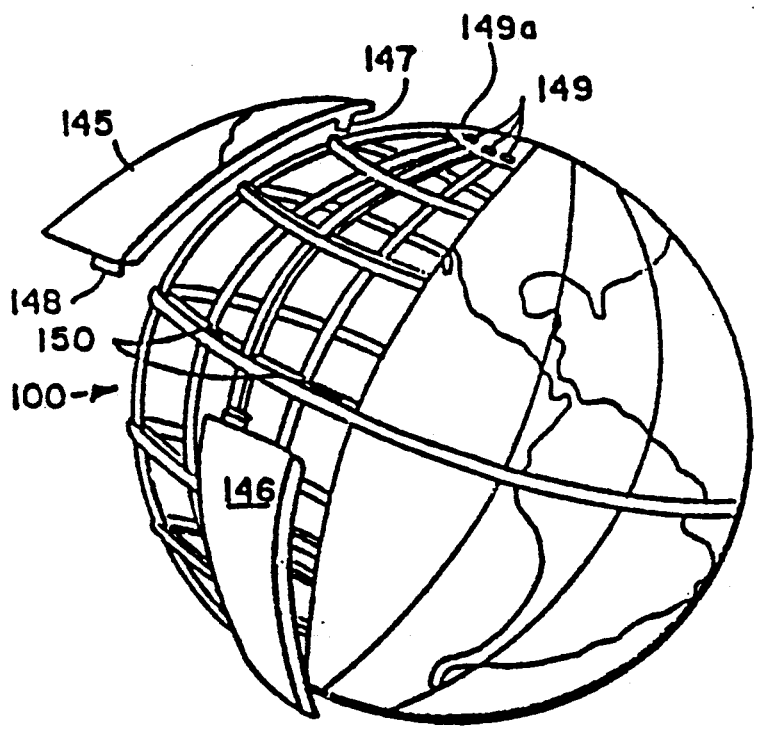
FIG. 32 is a perspective of a skeletal globe, the surface of which is comprised of spherical triangular segments.
Figure 33:
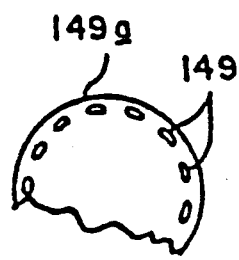
FIG. 33 is a plan view of a polar cap for the globe in FIG. 32.

An alternative structure for this fourth-level globe is illustrated in FIG. 32 in the form of a skeletal framework 100. In place of the spherico-polygonal blocks, a number of "tapered" or spherically triangular sections such as 145 and 146, fill in the framework and bear the cues. Each section may be attached to the framework, as is section 145, by the insertion of a polar tab 147 in a polar slot 149 and by the insertion of an equatorial tab 148 into an equatorial slot 150.

Figure 25:
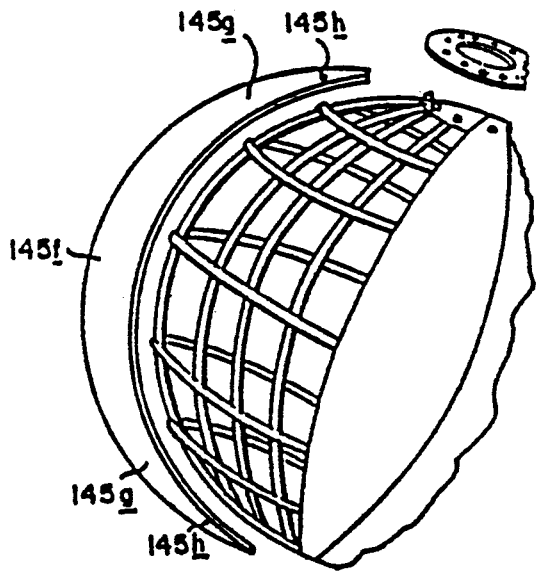
FIG. 25 is a perspective of a skeletal globe, the surface of which is comprised of spherical wedge-shaped elements.
Figure 34:
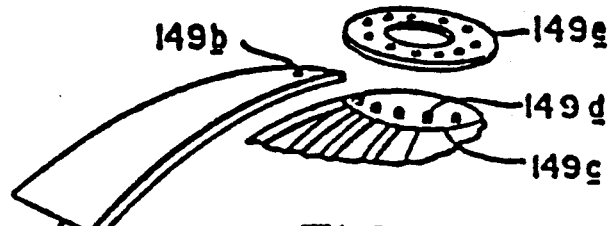
FIG. 34 is a fragmentary perspective of the globe provided with alternative fastening means for the triangular segments.

As alternatives to the polar tab/slot means, holes 149b may be provided at the punctate ends of the triangular sections, FIG. 34 and an annular polar element 149C is then provided having pegs 149d extending therefrom on one side. The pegs are inserted through the holes 149B in the triangular sections, holding them in proper position. If the pegs are inserted upward from below, a further annular disk 149e may be provided having holes which correspond to the pegs and may be pressure-fitted over them to further secure the triangular sections. Optionally, FIG. 25, "wedge" or "slice" shaped sections 145f may be used, each having two polar, punctate ends 145g containing holes 145h secured as described above to each pole of the skeletal framework. The broad part of these double-tapered sections may or may not be secured to an equatorial element.

Figure 35:
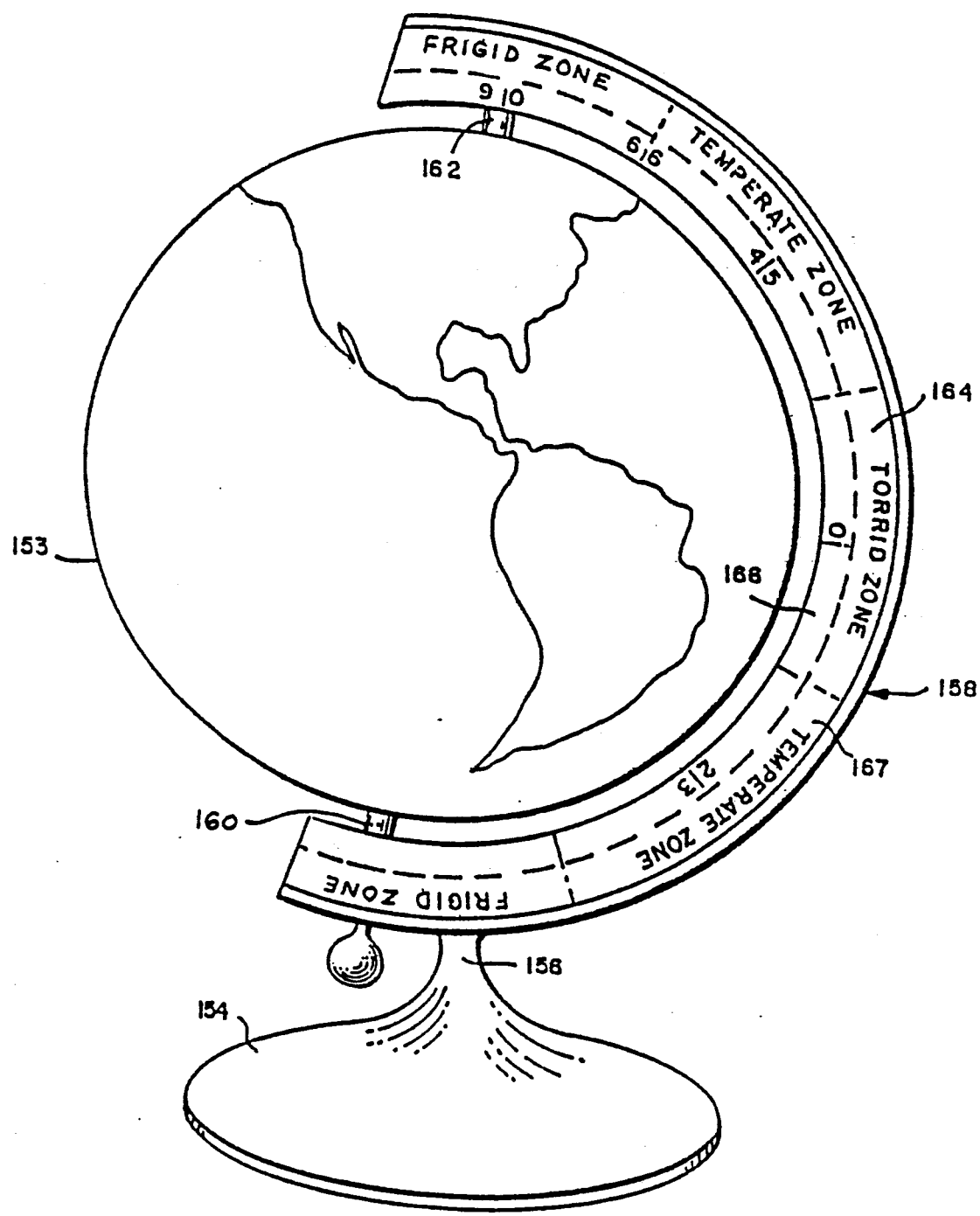
FIG. 35 is an elevation of the globe-shaped body provided with a stand and a removably attachable arcuate frame with elements that can be inserted in slots at the poles.

Desirably, the globe-shaped body, in whatever form, is provided with a support for convenience in assembly, for examination and for study and, for this purpose, a base 152, FIG. 1A, may be employed, to which the lower end of the shaft 30 is fixed with its axis at an angle corresponding to the inclination of the axis of the earth to the plane of the eliptic. The globe 11, FIG. 1A, is rotatable about the shaft 30 and, as previously related, can be rotated about the shaft 30 by a motor 31, FIG. 3. Alternatively, as shown in FIG. 35, the globe 153 is supported by a support comprising a base 154 and neck 156 to which the lower end of an arcuate frame 158 is detachably or permanently fixed. The arcuate frame 158 is of larger diameter than the globe. The globe is mounted between the ends of the frame in concentric relation thereto by bearing means 160 and 162, with a clearance between the surface of the globe and the inner side of the frame of sufficient magnitude to clear any protrusions on the surface of the globe due to the presence of appendages attached thereto. The lower bearing 160 can be a hollow shaft for receiving the winding stem of the key 38 for the motor. The arcuate frame 158 is desirably provided with flat surfaces 164 disposed in a diametral plane containing the polar axis and is provided with divisions 166 representing angular distances and with divisions 167 representing the climatic zones between the opposite pole, to wit, the North and South frigid zones, the North and South temperate zones, and the equatorial torrid zone.

The use and advantages of the invention are apparent from the above description of the parts and their interrelations. In brief, a teacher or child at study or play constructs the above-described globe from a collection of parts in an intermediate state of assembly.

The amount of assembly demanded of the child in a given context depends upon the features of geographical facts to be learned, as well as on his interest, perceptual level, learning modes, coordination, and so on.

In general, the level-one globe of FIG. 1A encourages the child, by play, to distinguish land from water, sea animals and the proper location of sea vessels.

One can look upon the embodiment of FIG. 4 as a second-level globe in which the student readily inserts appendages laden with geographic information in the proper indentation, reinforcing the proper placement of these features. As the student's conceptualization powers grow, appendages laden with more sophisticated information are made available.

Figure 14:
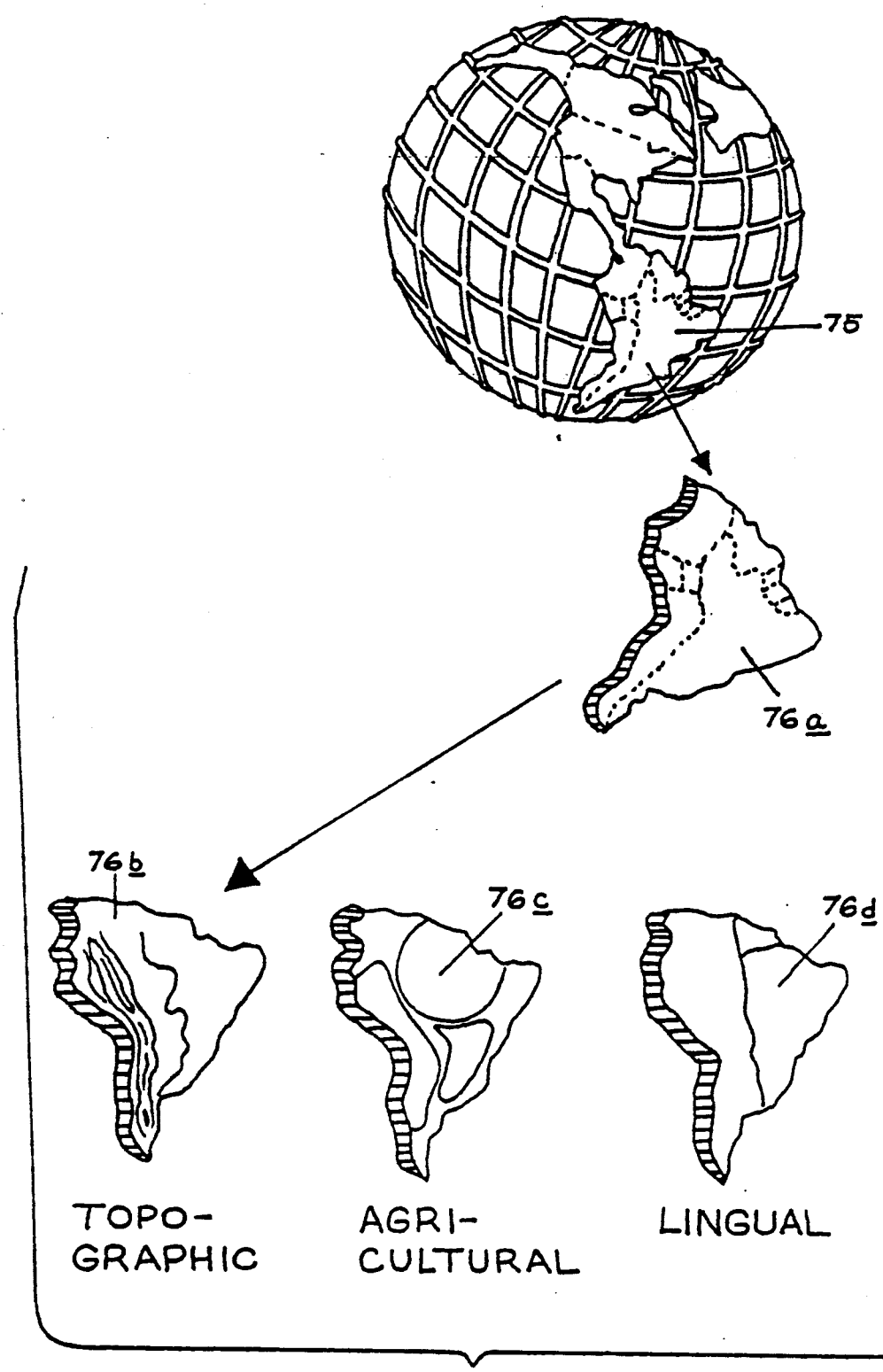
FIG. 14 illustrates diagrammatically the capabilities of the information-laden appendages to be progressively changed such as to form a puzzle of countries, regions, etc.

The embodiment of FIG. 14 represents the next step in learning growth, when the student needs less prominent cues as to the proper placement of the overlays.

In what may be called a fourth level of development, the child may progress to the embodiment of FIG. 24. The student has learned the concepts involved in latitude and longitude and the general location of continents and the like. He is then in a position to construct the globe-shaped body from blocks or sections. Each of these blocks or sections carries a portion of the cues the student will use to guide his proper placement of the appendages. The geographic concept represented on each appendage will be thereby reinforced.

The teacher may construct the entire globe during a lesson. For example, she may start with a skeletal framework, inserting the blocks in their proper places to form the globe-shaped body with its collection of cues. She may then attach the appendages in their proper places and attach the shaft, a stand, and the hemispherical shell, rotating the globe to illustrate the progression of the circle of illumination.

Or, the teacher may present a completed globe-shaped body (including its cues) to the less knowledgeable child, who will then apply the spherical segments with guidance from the cues. This will begin reinforcement of geographical relationships, especially if cues are simple outlines, but the spherical segments are information-laden. Thus, the outer surfaces of the segments may have stylized topography, political divisions, agricultural indicia, climate indications, indications of the flora and fauna indigenous to a region, a representation of air or ocean currents, etc.

Finally, a relatively sophisticated student may be given a skeletal framework, a collection of blocks, and a collection of appendages as described above and may be asked to form the globe-shaped body, attach the appendages, and apply the circle of illumination by himself. A vast number of geographical concepts are reinforced concretely in this manner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An instructional globe comprising a globe-shaped body forming a representation of the surface of the earth by a number of information-laden, three dimensional spherical surface appendages, wherein said appendages comprise spherical surface segments depicting geographical features, wherein there are cues on the surface of the globe having a profile corresponding in configuration to specific ones of said spherical surface segments, and wherein there are interengageable attaching means for removably attaching said appendages to said globe-shaped body a substantially unlimited multiplicity of times at their appropriate cues in manners and positions to visually or tactically reinforce spherical geographical concepts of the world.

2. An instructional globe according to claim 1, wherein said cues are indentations, and said spherical surface segments are formed of resilient material such that each of said spherical surface segments can be snapped into its corresponding cue.

3. An instructional globe according to claim 1, wherein the globe-shaped body is in the form of a hollow or skeletal structure comprised of longitudinally and latitudinally-crossing ribs disposed at a spacing corresponding to predetermined angles of longitude and latitude, and said ribs or the spaces between the ribs defining said cues within which said appendages are removably received.

4. A hollow instructional globe according to claim 1, wherein said globe-shaped body is comprised of a transparent or translucent material and wherein the appendages are transparent or translucent and are removably attachable to the surface of the sphere in positions representing the continental areas.

5. An instructional globe comprising a globe-shaped body according to claim 1, further comprising an axial shaft supporting the globe-shaped body for rotation about a polar axis and a base to which one end of the shaft is fixed in an upright position.

6. An instructional globe according to claim 1, wherein the globe-shaped body has raised or indented ribs corresponding to the lines of longitude and latitude.

7. An instructional globe according to claim 1, wherein said globe-shaped body is comprised of two translucent or transparent hemispherical members which define the north and south hemispheres of the earth, means at the diametral edges of the hemispherical members for detachably joining said hemispherical members, and means mounting the hemispherical members to the shaft.

8. An instructional globe according to claim 7, wherein the globe-shaped body is hollow and includes therein at least a sector of a disk, the disk being concentric with the axis of the globe and removably attachable to either the shaft or the globe-shaped body, said disk carrying representations of the strata of the earth's interior.

9. An instructional globe according to claim 8, comprising a hemispherical shell encompassing one-half of the globe-shaped body and mounted to the shaft by means permitting relative rotation of the globe-shaped body and the shell, said shell having a diametrical edge in a plane perpendicular to that of the elliptic.

10. An instructional globe according to claim 9, wherein there is means for detachably attaching the hemispherical shell to the shaft.

11. An instructional globe according to claim 1, comprising a globe-shaped body embodying raised crossing ribs representing lines of longitude and latitude, said ribs defining a plurality of concave-convex polygonal windows and a plurality of concave-convex, polygonal blocks, each adapted to fit closely in a corresponding one of the concave-convex, polygonal windows, each block having an upper portion defining a top surface bearing a geographically significant representation which is relatively positionally appropriate when the blocks are fitted into their corresponding windows and a lower portion defining means for removably securing the block in its corresponding window.

12. An instructional globe according to claim 1, wherein each appendage represents a geographically significant, positionally appropriate portion of the globe.

13. An instructional globe as recited in claim 1, wherein said globe-shaped body has areas representing oceans and wherein said area representing oceans have embossed engraved, imprinted, or three-dimensional representations showing waves.

14. An instructional globe according to claim 1, wherein the interengageable attaching means comprise holes in the globe-shaped body and the appendages are provided with pegs fixed to their inner sides for engagement with said holes for removably attaching the appendages to the globe-shaped body.

15. A globe-shaped body according to claim 1, wherein the globe is provided with imprinted or engraved outlines and there are appropriately configured appendages detachably attached to the spherical surface in the areas defined by said imprinted or engraved outlines.

16. An instructional globe according to claim 1, wherein land areas are formed in a stylized manner and magnified so that they are easily understood.

17. An instructional globe according to claim 1, wherein the segments are comprised of a transparent or translucent material.

18. An instructional globe according to claim 1, wherein a removably attachable arcuate frame is employed depicting the angular extent of the climatic zones.

19. An instructional globe according to claim 3, comprising a combination of a globe-shaped body in the form of a hollow or skeletal structure having well-defined poles comprised of longitudinally and latitudinally-crossing ribs disposed at a spacing corresponding to predetermined angles of longitude and latitude and a series of semi-spherical wedge-shaped segments representative of the distance between degrees of longitude said segments collectively defining a spherical surface when placed over the globe-shaped body and wherein there are outlines or maps drawn on the surface of said semi-spherical elements which define land and sea areas and wherein said elements are removably attached to the framework by means provided at the poles.

20. An instructional globe according to claim 18, wherein said spherical triangles are removably attached to the globe-shaped body with their apices at the poles and their bases at the equator.

21. An instructional globe as recited in claim 1 forming a representation of the earth by a number of three-dimensional spherical surface appendages which magnify the topography of the earth several times to simulate an aerial view of the earth, and wherein said appendages depict land areas.

22. An instructional globe as recited in claim 3 forming a representation of the earth by a combination of a hollow or skeletal sphere having raised or indented parallels and meridians and a number of information laden three-dimensional blocks wherein the spaces between the parallels and meridians comprise mechanically interengageable means detachably attaching the blocks to globe shaped body at its appropriate location.

23. An instructional globe according to claim 22, wherein the attachment of said blocks produces indentations representing parallels and meridians.

24. An instructional globe according to claim 22, wherein the spherical three-dimensional blocks collectively constitute a spherical surface.

25. An instructional globe according to claim 22, comprising a spherical structure embodying a spherical exterior surface containing recesses for removably receiving spherical surface segments, each segment having an exterior three-dimensional surface representing the area of the structure to which each of the segments is to be removably attached.

* * * * *